United States Patent

Kurtz

[11] 3,888,561
[45]* June 10, 1975

[54] REAL TIME, LARGE VOLUME, MOVING SCENE HOLOGRAPHIC CAMERA SYSTEM

[75] Inventor: Robert L. Kurtz, Huntsville, Ala.

[73] Assignee: The United States of America as represented by the Administrator of the National Aeronautics and Space Administration, Washington, D.C.

[*] Notice: The portion of the term of this patent subsequent to Aug. 7, 1990, has been disclaimed.

[22] Filed: Aug. 10, 1973

[21] Appl. No.: 387,266

[52] U.S. Cl. ............................................... 350/3.5
[51] Int. Cl. ........................................... G02b 27/00
[58] Field of Search .......... 350/3.5; 352/44, 84, 86, 352/85 H

[56] References Cited
UNITED STATES PATENTS
3,535,014  10/1970  Kurtz ................................. 350/3.5
3,752,556  8/1973  Kurtz ................................. 350/3.5

*Primary Examiner*—Ronald J. Stern
*Attorney, Agent, or Firm*—George J. Porter; John R. Manning; L. D. Wofford, Jr.

[57] ABSTRACT

A holographic motion picture camera system producing resolution of front surface detail. The system utilizes a beam of coherent light and means for dividing the beam into a reference beam for direct transmission to a conventional film transport and three reflection signal beams for transmission to the film transport by reflection from the three orthogonal sides of a moving scene. The system is arranged so that critical parts of the system are positioned on the foci of three interrelated mathematically-derived ellipses. The camera has the theoretical capability of producing motion-picture holograms of an object moving at speeds as high as $9 \times 10^5$ cm/sec (about 21,450 mph). The system has the capability of handling objects of relatively large volume moving in a random direction anywhere within a volume.

4 Claims, 11 Drawing Figures

REAL TIME, LARGE VOLUME, MOVING SCENE HOLOGRAPHIC CAMERA SYSTEM

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

1. Field of the Invention

This invention relates to holography and more particularly to an improved apparatus and method for producing holographic motion pictures having resolution of front surface detail.

2. Description of the Prior Art

Presently, there are several techniques for producing holograms. The general requirements for hologram production are that one uses a coherent beam of radiation as a source and a beam splitter to obtain two coherent beams, one referred to as the signal beam and the other the reference beam. The reference beam is generally allowed to pass directly to a photographic recording plate without any form of disturbance. The signal beam is made incident on the object under test, either by reflection of the signal beam from the test object, or by direct transmission of the signal beam through or by the test object. The test object, being placed in the path of the signal beam, imposes a specific modulation on the signal beam. This modulated signal beam is then incident on a photographic plate along with the reference beam. At a given moment, the field pattern produced in the plane of the photographic plate (by the interference between the reference beam and the modulated signal beam) is essentially frozen by the photographic emulsion. This arrested field pattern (or interference pattern) is not a photograph in the usual sense since there is no image, but is simply a recorded interference or diffraction pattern. The developed photographic plate constitutes a reconstructable hologram. That is, if the developed hologram is placed in the path of the reference beam alone, the image of the object under test is reconstructed. The image of the test object appears authentically, in three dimensions and with parallax identical to the original test object.

Two types or methods used in the past for producing holograms are the reflection method and direct method. The refection method as the name implies, reflects the signal beam from the test object in a forward direction where it is then directed to be incident on the photographic plate. When a hologram taken by this method is reconstructed, the test object has excellent front surface resolution since it is front illuminated; however, in general this method has the disadvantage of extremely stringent requirements on the mechanical stability of the test object and the component parts of the holographic camera. In the direct method the signal beam is transmitted through or by the test object after having first passed through a diffuser plate positioned between the light source and the test object. The direct method has the advantage of partially relaxing the stringent requirements on mechanical stability of the test object but has the disadvantage of no resolution of detail of the front surface of the test object since the test object is only illuminated from the back.

Holography of moving scenes has motivated considerable interest and effort on the part of inventors, scientists and researchers working in this field. However, it has been found that any motion of the scene during the exposure of a hologram results in a spatial modulation of the recorded fringe contrast. On reconstruction, this produces a spatial amplitude modulation of the reconstructed wavefront, which results in a blurring of the image, not unlike that of a conventional photograph. For motion of the scene sufficient to change the path length of the signal arm, by approximately $\lambda/2$, this blurring is generally prohibitive (where $\lambda$ is the wavelength of the radiation being used).

Moving scenes holography covered by previous interest and experimentation has included: microscopic particles, aerosol sprays, seeded gas flow and bullet type projectiles. The bullet or macroscopic projectiles have received considerable attention recently. A search of the literature by the inventor prior to the filing of his co-pending patent application, Ser. No. 149,283, filed June 2, 1971, now U.S. Pat. No. 3,752,556 dated Aug. 14, 1973 showed that the highest target velocity for which a hologram was successfully recorded, up to that time, was 375 meters/sec. Moreover, no report of front light resolution of targets moving at high speeds was found in that search of the technical literature. This is certainly due in part to the severe $\lambda/2$ restriction on the change in path length of the signal arm of the holographic arrangement.

Prior art three dimensional motion holographic pictures have allowed animation of motion, that is, successive exposures with the scene being rotated or moved between exposures. Prior to the inventor's co-pending patent application, Ser. No. 149,283, now U.S. Pat. No. 3,752,556 however, the scene was not allowed to be in motion during the exposure. Although simple backlighted motion pictures have been obtained, resolution of front surface detail has never been obtained for high velocities. Some success has been found with very low velocities (a few centimeters per second) using a short pulse ruby laser. The present inventor knows of no prior art applications of true real time holographic motion picture photography allowing resolution of front surface detail, prior to his own co-pending patent application, Ser. No. 149,293, now U.S. Pat. No. 3,752,556.

Accordingly it is an object of this invention to provide an improved holographic system.

Another object of this invention is to provide a real time holographic motion picture camera system allowing resolution of front surface detail.

Still another object of this invention is to provide a real time holographic motion picture camera system capable of photographing a projectile, vehicle or other object traveling at a very high rate of speed in a random direction, anywhere within a volume.

SUMMARY OF THE INVENTION

According to the present invention it has been found that a holographic motion picture camera system can be made which accomplishes the aforementioned objectives by utilizing a coherent light source to produce a beam of radiation, splitting the said beam into a first direct signal beam and a reference beam, splitting second and third direct signal beams from said reference beam, reflecting said reference beam into a motion picture camera back, making said three direct signal beams incident upon a moving scene to be photographed so that all said direct signal beams produce front surface resolution of the moving scene and are then returned into the said motion picture camera back or film transport. The invention is arranged so that certain functions take place at focal points located on the long axes of three interrelated ellipses arranged with their long axes normal to each other and with $f_2$, the second focal point of each ellipse, coinciding. The original coherent light beam is split into the reference beam and the first direct signal beam at focal point $f_1$ of the first ellipse. The second direct signal beam is reflected (and then made incident upon the moving scene) at a focal point $f_1$ of the second ellipse. The third direct signal beam is likewise reflected at focal point $f_1$ of the third ellipse. The motion pictures i.e. interference patterns are taken at the point where focal points $f_2$ of all three ellipses coincide.

BRIEF DESCRIPTION OF THE DRAWINGS

The invention will be more fully understood by the following detailed description when taken together with the accompanying drawings in which.

DESCRIPTION OF THE PREFERRED EMBODIMENT

Figure 1:
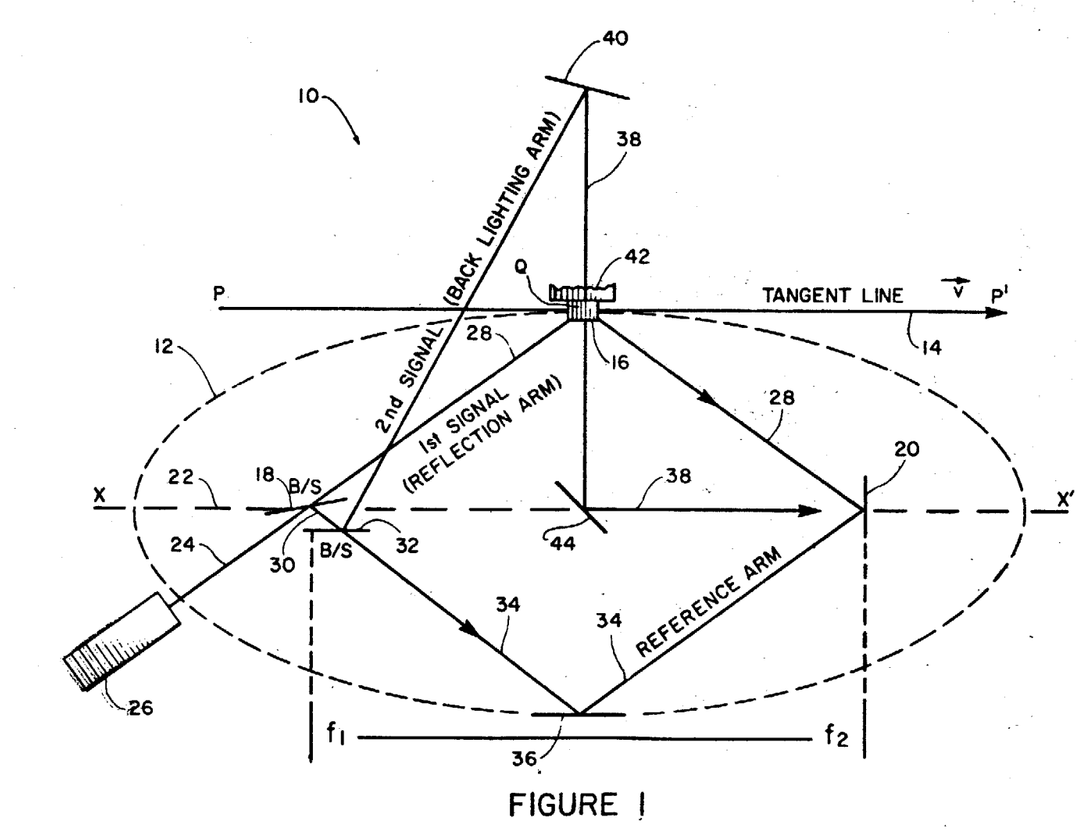
FIG. 1 is a schematic diagram of a type of hybrid laser system configuration previously disclosed by the present inventor in U.S. Pat. No. 3,535,014 dated Oct. 20, 1970.

Referring to FIG. 1, there is shown a type of hybrid holographic camera system 10 which was previously developed by the present inventor during some of his earlier work in holography. The system is based on the use of a ellipse 12 oriented with its major axis parallel to the "line of motion" 14, defined by a moving projectile 16 or other moving object to be holographed. This line of motion 14 must be made tangent to the ellipse 12 at some point Q. One possible configuration of the holographic system 10 positioned in this preferred orientation, inside the ellipse 12 is shown in FIG. 1. The specific orientation is defined by the following conditions: A thin film beam splitter 18, centered at the focus $f_1$; of the ellipse 12; a film plane 20 centered at the other focus $f_2$; and the major axis 22 of this ellipse, defined by XX' in the Figure, being parallel to the tangent line, $pp'$ of FIG. 1, which may be identified as the line of motion 14 of the high speed projectile 16. The system may be described as follows: radiation 24 from laser 26 is incident on the first thin film beam splitter 18, centered at the focus $f_1$. The transmitted beam 28 from here is made incident on the projectile 16, which is moving along the tangent line $pp'$, and is momentarily at the point Q on the perpendicular bisector of XX'. The beam 28 is then reflected or scattered from the projectile 16 and made incident on the film, centered at the focus $f_2$. The reflected beam 30 from the beam splitter 18 at $f_1$, is made incident on another beam splitter 32, just slightly displaced from $f_1$, where it is again split into two beams 34 and 38. The transmitted beam 34 constitutes the reference beam for the system and after a reflection from a mirror 36 this reference beam is made incident on the film 20 at focus $f_2$. The reflected beam 38, from this last beam splitter 32 is used as a second signal beam which backlights the target (projectile) 16. After being incident on a mirror 40 this signal beam 38 passes through a diffuser plate 42 in the region of the projectile 16 where it then is incident on the film 20 at focus $f_2$, after being reflected by another mirror 44.

From the use of the backlighting arm (second signal beam 38), one is reasonably assured of a backlighted hologram, i.e., a silhouette of the moving projectile 16, with this information one has more freedom to manipulate the ellipse 12, until one obtains front surface resolution of the silhouetted projectile 16.

Figure 2A:
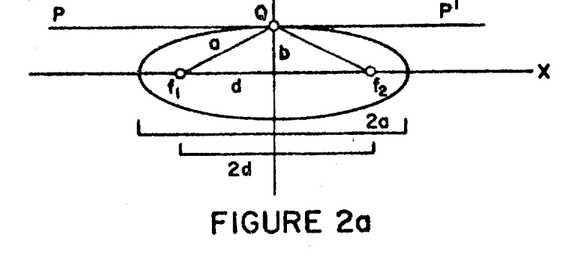
FIGS. 2a, 2b, and 2c are a family of successive ellipses with constant separation of foci, demonstrating linear motion in terms of elliptic parameters.
Figure 2B:
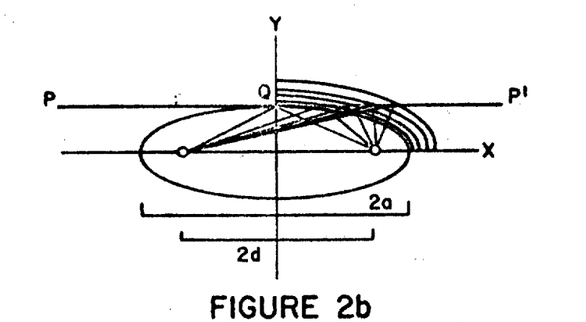
Figure 2C:
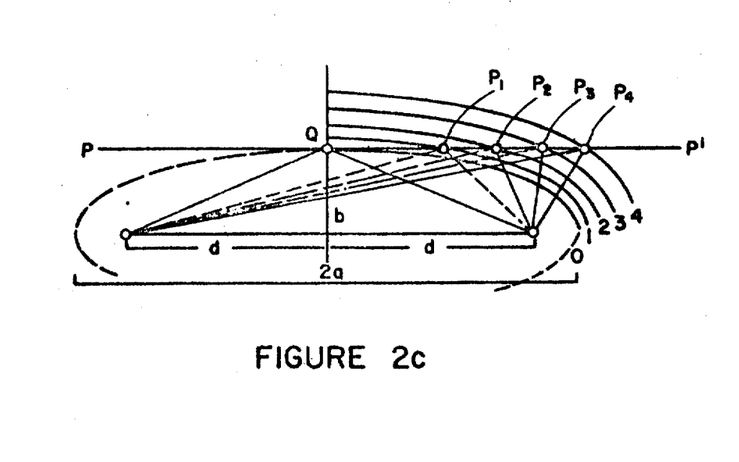

The exact matching of the length of the three arms 28, 34 and 38 is of no real concern if one has a laser 26 with sufficient coherence length. The source 26 used by the present inventor has a coherence length greater than 3 meters, operates at 6,943 A and has a pulse length as short as 15 nanoseconds. The calculations which follow use a time of 35 nanoseconds, so the numerical values given in calculations below are conservative:

The following discussion relates to linear motion in terms of elliptic parameters. FIG. 2 shows a family of successive ellipses with constant separation of force. Consider FIG. 2a, the general equation of such an ellipse is given by:

$$b^2x^2 + a^2y^2 = a^2b^2$$

The line segment $pp'$ is considered to be tangent to this ellipse at the point Q which lies on the perpendicular bisector of XX'. This line $pp'$, in FIG. 2a, is identical to the tangent line $pp'$ of FIG. 1. It is the line of motion of the high speed projectile, is parallel to the major axis XX', of the ellipse, and may be considered perfectly straight. The projectile travels along $pp'$, of FIG. 2a, and reaches the point Q at some time $t_0$. The radiation incident at this point, at $t_0$, will be reflected to the film which is positioned at focus $f_2$. At this particular moment the ellipse passes through the point Q, with a beam splitter at $f_1$ and a film at $f_2$, and we have the situation depicted earlier, in FIG. 1.

As the projectile moves some incremental distance $\Delta x$, along $pp'$, past the point Q, it moves off this initial ellipse, but it can be considered to move immediately onto another ellipse, just slightly larger than the initial one. If the elliptic constant of the initial ellipse was $2a$, then the ellipitc constant of this new ellipse will be $2(a+\Delta a)$. The radiation reflected or scattered from this moving projectile will then be incident on the film at $f_2$, and will interfere there, with the reference beam, as long as $2a$ is less than $\lambda/2$.

In FIG. 2b, we construct a family of such ellipses, each successive ellipse being intercepted by the line segment PP', as one moves from Q toward the right along PP' parallel to the $x$ axis of the coordinate system. We require the separation of the foci remain constant and equal to $2d$ for the entire family of curves. FIG. 2c is a convenient enlargement of the first quadrant of FIG. 2b. The points of interception of PP' with each successive member of the family of ellipses is given by $P_1$, $P_2$, $P_3$, etc., respectively. We maintain that as PP' is traversed to the right, the original ellipse can be considered to "grow" successively, to the next larger member of its family, while the foci separation distance $2d$, remains constant.

If we consider that the ellipse is to "enlarge" during the time $t$, then expanding to a larger ellipse, equation (1) becomes:

$$b^2 x \Delta x + b \Delta b x^2 + a^2 y \Delta y + a \Delta a y^2 = a^2 b \Delta b + b^2 a \Delta a \qquad (2)$$

Since the direction of projectile motion is parallel to the $x$ axis, $\Delta y = o$ and we have, $$b^2 x \Delta x = a \Delta a (b^2 - y^2) + b \Delta b (a^2 - x^2). \qquad (3)$$

However, from FIG. 2a, $$a^2 - b^2 = d^2; \qquad (3')$$

where $d$ is a constant, therefore $$a \Delta a = b \Delta b$$

and equation (3), becomes, $$b^2 x \Delta x = a \Delta a [a^2 + b^2 - (x^2 + y^2)]. \qquad (4)$$

From the basic equation for our ellipse, equation (1), we may easily obtain $$x^2 + y^2 = b^2 + x^2 \left(1 - \frac{b^2}{a^2}\right) \qquad (5)$$

By substitution of (5) into (4), we obtain, $$x \Delta x = \frac{\Delta a}{ab^2} (a^4 - d^2 x^2). \qquad (6)$$

For any ellipse $2a = L$, where L is a constant and at present is the optical path length of the front illumination signal arm. When the ellipse expands due to projectiles travel along PP', then $2a = L$ changes by $2\Delta a = \Delta L$. Therefore since $\Delta a = \Delta L/2$ equation (6) becomes, $$x \Delta x = \left(\frac{\Delta L}{2}\right) \frac{1}{ab^2} (a^4 - d^2 x^2) \qquad (7)$$

Now since we have taken the point Q as the reference point for $x$, i.e., $x$ is zero when the projectile is at the point Q, therefore, as measurement of the projectile motion starts from the Point Q and traverses to some point P, $x = \Delta x$, and equation (7) becomes, $$(\Delta x)^2 = \frac{\Delta L}{2} \frac{1}{ab^2} [a^4 - d^2 (\Delta x)^2] \qquad (8)$$

or $$(\Delta x)^2 = \frac{\frac{\Delta L \, a^4}{2b^2}}{1 + \frac{\Delta L \, d^2}{2ab^2}} \qquad (9)$$

Making the assumptions that the magnitude of $d^2$ is not drastically different from $b^2$ and $(\Delta L/2) \ll a$, we have that $$\frac{\Delta L d^2}{2ab^2} \ll 1$$

and equation (9) becomes, $$(\Delta x)^2 = \left(\frac{\Delta L}{2}\right) \frac{a^4}{b^2}$$

or $$(\Delta x) = \left(\frac{\Delta L}{2}\right)^{1/2} \frac{a^2}{b} \qquad (10)$$

where $L = \Delta 2a$ is the variation in the original elliptic constant $2a$, due to the travel $\Delta x$, of the projectile along PP'. At a given velocity, V, for a time $t$, $$\Delta x = Vt \qquad (11)$$

where $t$ is the pulse length and is also the exposure time.

Equation (10) is therefore an expression which relates the distance $\Delta x$, traveled by the projectile along PP', to the total change in elliptic constant, $\Delta L = 2\Delta A$, i.e., $\Delta L$ is the change in optical path length of the front surface illumination arm, of the holographic system. Substitution of equation (11) into (10) and solving for the projectile velocity, we have $$V = \left(\frac{\Delta L}{2}\right)^{1/2} \frac{a^{3/2}}{bt} \qquad (12)$$

We may use this relation to determine the permissible projectile velocities allowed by the specific configuration having a set of elliptic parameters and a specified tolerance $\Delta L$. For illustration we arbitarily set $\Delta L$ equal to $\lambda/8 (\lambda = 6,943A)$, and let the distance of separation between the center of the first beam splitter, at $f_1$, and the center of the photographic film, at $f_2$, be a constant value, $2d$. By varying the semi-major axis, $a$, which in turn varies the semi-minor axis, $b$, we may obtain a set of permissible velocities. This set of velocities are graphically shown in FIG. 3, where we have used the permissible velocity values as ordinate and arbitarily chosen values of semi-major axis, $a$, as abscissa. Each separate curve corresponds to a specific value $d$, and the elliptic parameters are related by $a^2 = d^2 + b^2$.

Figure 3:
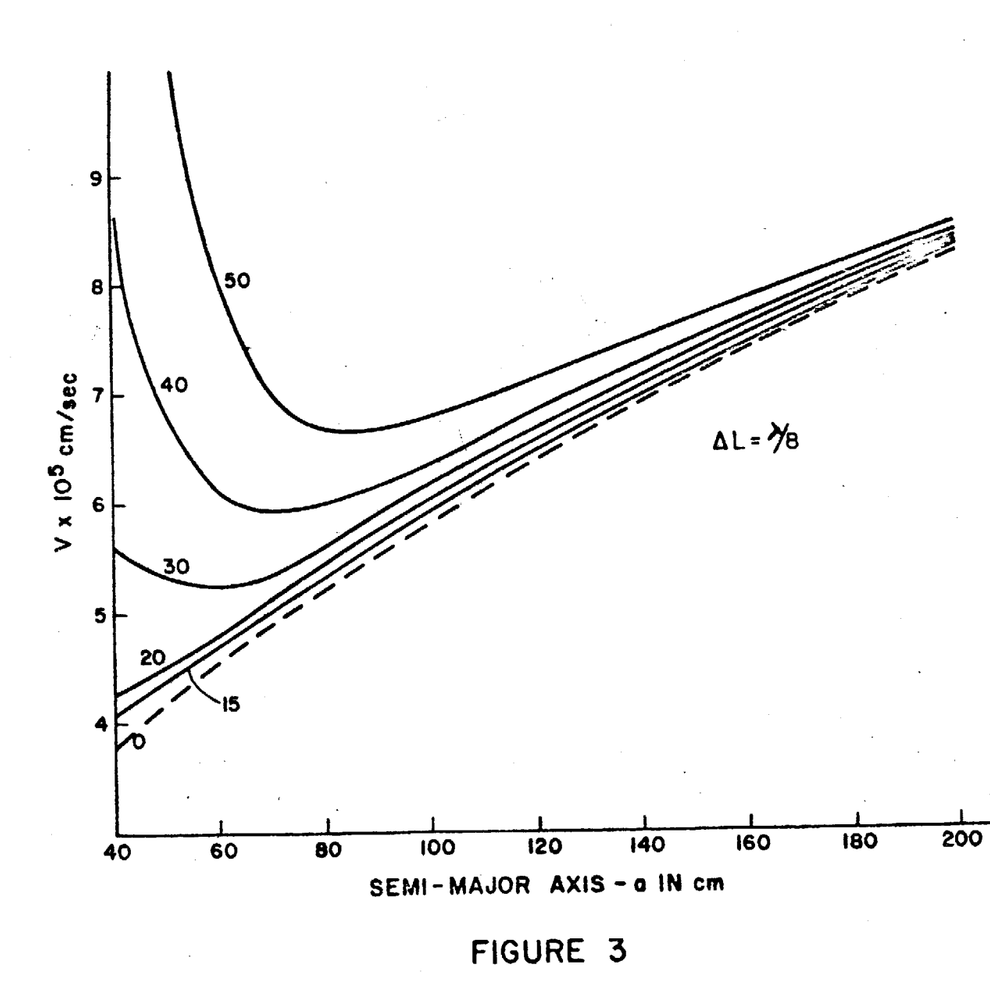
FIG. 3 is a graph showing permissible velocity of a projectile for allowed path difference, $\Delta L = \lambda/8$.

It may be interesting to note the following:

a. For this fixed value of $\Delta L$ and each assigned value of $d$, the curve approaches the vertical line, $a=d$ asymptotically. This seems to indicate that the projectile velocity can be any high value without limit if $a=d$. Obviously this is not practical, since at $a=d$, $b=o$ and the projectile would have to pass directly through the beam splitter and film. However picking the smallest practical value of $b$, allows the highest possible velocity, for a given value of $d$. As the assigned value of $d$ increases, (bounded by some practical value of $d$), the curve rises and thereby raises the allowed value of velocity. Although, due to the steepness of the curve, this region may be somewhat unstable, with respect to changes in $a$ or $b$.

b. As the assigned value of $d$ decreases, the respective curve lowers. The lower bound for these curves occurs at $d$ equal to zero; i.e., the ellipse becomes a circle. This is again impractical because the beam splitter would be located at the photographic plate.

c. Differentiation of equation (12), shows that each curve has a minimum at the value of $a = \sqrt{3d}$. Substitution of this back into equation (12), produces $$V_{min} = \left(\frac{3^{3/4}}{2}\right) \left(\frac{d\Delta L}{t^2}\right)^{1/2} \quad (13)$$

This $V_{min}$ is the minimum permissible value of the velocity for each specific value of $d$. Because each curve has a zero slope at this point, the region about this point is the most stable region with regard to possible changes in the value of the elliptic parameters $a$ or $b$. (Changes in $a$, and therefore $b$, will occur as the ellipse enlarges due to projectile travel $\Delta x$, further changes in $b$, and therefore $a$, might occur due to the projectile varying slightly off path as it travels along the line of motion).

Figure 4:
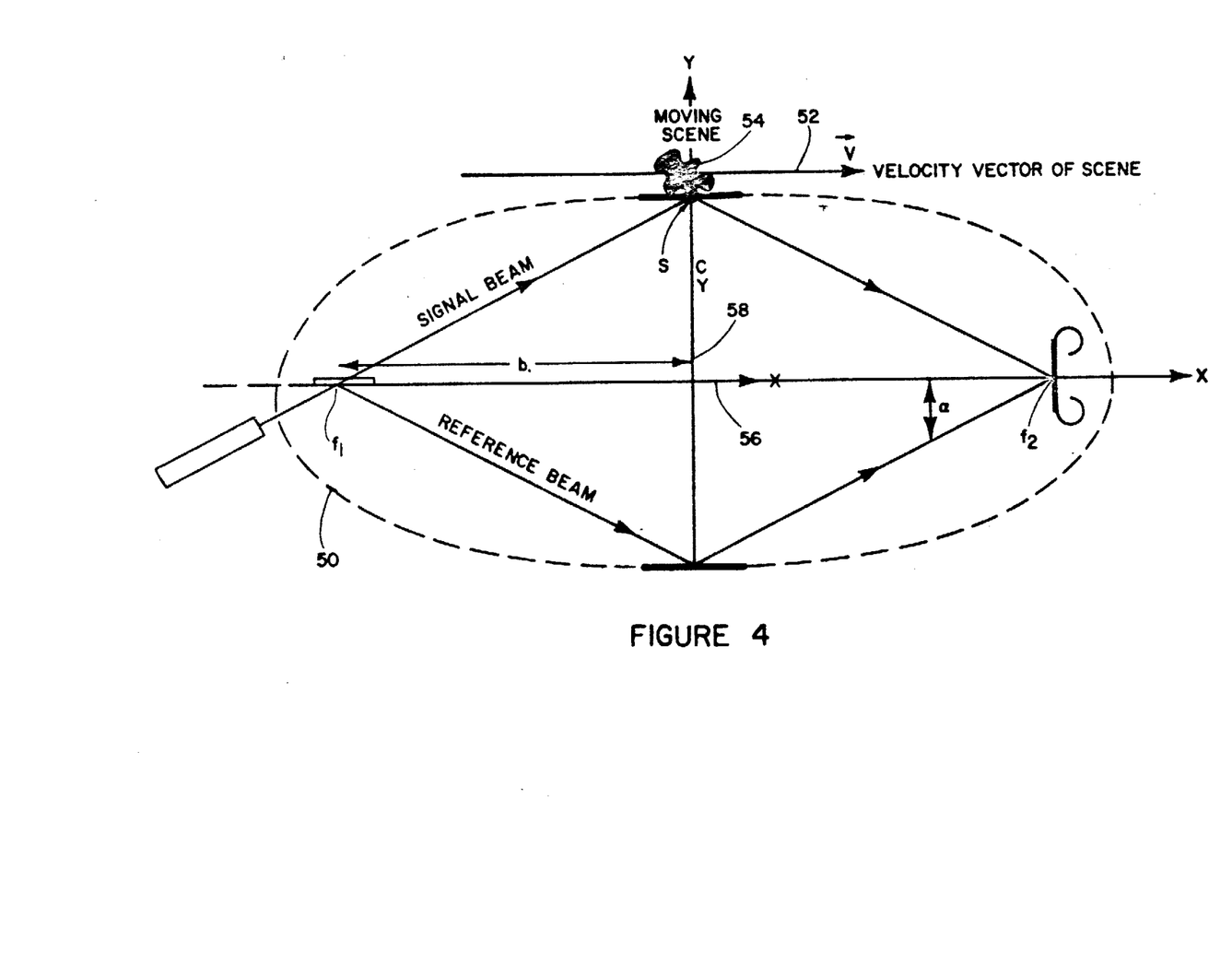
FIG. 4 shows a schematic diagram of a portion of the invention related to an ellipse, with the velocity vector of a moving scene oriented along the direction parallel to the $x$ axis of the ellipse.

Now consider FIG. 4, where we diaplay an ellipse 50 with velocity vector 52 of the scene 54 oriented along the direction parallel to the $\vec{x}$ axis 56. Then from the previous description of the properties of this elliptical orientation we know that front surface detail will be resolved from our scene 54 by this particular elliptical orientation so long as the velocity of the scene 54 stays essentially parallel to the $\vec{x}$ axis, 56. And, of course, does not travel further than scene distance $\Delta x$ given by FIG. 3. Scene 54 must stay in the field of view, where the field of view is governed by the size of the ellipse used. Therefore the particular orientation of FIG. 4 will resolve front surface detail from the scene 54 so long as the velocity vector 52 travels essentially parallel to the $x$ axis. (i.e. its component along $x$).

Now consider the following change to the device shown in FIG. 4. Simply rotate the system of FIG. 4 by 90° about the point S and retain the same $xy$ coordinate system. Now let the scene 54 travel explicity parallel to the $y$ axis (i.e. 90° to its travel in FIG. 4). In this case our particular orientation will resolve front surface detail from the scene so long as the velocity vector remains essentially parallel to the $y$ axis 58 (its component along $y$).

From vector analysis however we know that any arbitrary vector A is completely described (in 2 dimensions) by its 2 components respectively in the 2 directions i.e.

$$\vec{A} = \hat{i}A_x + \hat{j}A_y$$

our velocity vector can be described by $$\vec{V} = \hat{i}V_x + \hat{j}V_y$$

Therefore if we properly combine the orientation of FIG. 4 with that of the 90° rotation described above we then have the arrangement shown in FIg. 5, which is an illustrative embodiment of the invention disclosed in the present inventor's copending U.S. Pat. application, Ser. No. 149,283, filed June 2, 1971, now U.S. Pat. No. 3,752,556. Ellipses 60 and 63 are interrelated by having their long axes 57 and 59, respectively, perpendicular to each other and their second foci coinciding. Ellipses 60 and 63 are also oriented so that velocity component V1 (Vx) is tangent to ellipse 60 and parallel to its long axis 57 and velocity component V2 (Vy) is tangent to ellipse 63 and parallel to its long axis 59.

Figure 5:
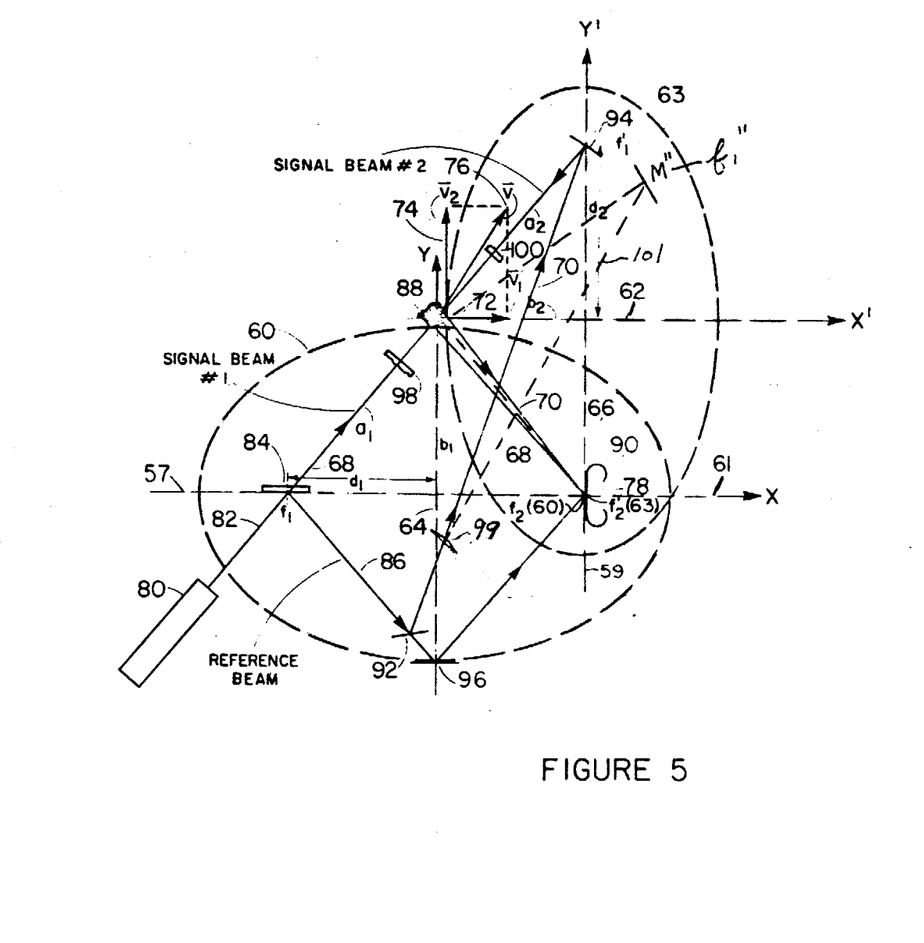
FIG. 5 is a schematic diagram of an illustrative embodiment of the invention disclosed in the inventor's copending application, Ser. No. 149,283, filed June 2, 1971, now U.S. Pat. No. 3,752,556, dated Aug. 14, 1973.

Consider the particular orientation called ellipse No. 1, designated by numeral 60. Then from the above this sytem will record front surface detail from the scene 88 for all scene motion having a velocity component 72 parallel to $x$ (61) or $x'$ (62). Further, ellipse No. 2, designated by numeral 63 will record front surface detail from the scene 88 for all scene motion having a velocity component 74 parallel to $y$ (64) or $y'$ (66). Since both systems make the modulated signal beams 68 and 70 incident at $f_2$ they both will combine and interfere with the common reference beam 86 at $f_2$ to form a hologram of the total information content of the scene. Since we have all the information of both components $V_1$ (72) and $V_2$ (74) of the resultant velocity vector V (76) we have all the information from the total velocity vector of the scene available to us. Further, since we have recorded this in moving frames on film located at the camera back or film transport 78 of the 3-D motion picture camera (synchronized with the laser source) we have obtained motion pictures. Since we have arrested interference patterns we have retained the phase information; consequently we have three dimension motion pictures of the activity of the scene.

One cycle of operation of the embodiment of the invention shown in FIG. 5 follows: Laser 80 produces a beam 82 of coherent light. Beam 82 strikes beam splitter 84 where it is split into reference beam 86 and signal beam 68. Signal beam 68 is incident upon scene 88 and reflected to the film located at back 78 of conventional motion picture film transport 90. Reference beam 86 strikes beam splitter 92 where signal beam 70 is reflected off to mirror 94. Signal beam 70 is scattered from moving scene 88 and then incident on film located at back 78 of motion picture film transport 90. Reference beam 86, after passing through beam splitter 92 is reflected by mirror 96 against film located at back 78 of motion picture film transport 90. If desired, diffusers 98 and 100 may be added in the path of signal beams 68 and 70 respectively in a manner already known in the art of holography, so as to properly match optical path lengths.

In accordance with theory given before, foci $f_2$ of both ellipses 60 and 63 coincide at a single point. The plane of the film located at back 78 of motion picture film transport 90 is positioned at $f_2$ so that it (the plane) is perpendicular to line $f_1 f_2$ of ellipse 60 and contains the line $f_1 f_2$ of ellipse 63. Therefore, film transport 90 records motion of scene 88 in a direction parallel to $x$(61) and $x'$(62), represented by $V_1$(72), and in a direction parallel to $y$(64) and $y'$(66), represented by $V_2$(74), consequently in the direction of V(76), which is the resultant vector of components $V_1(72)$ and $V_2(74)$.

In the foregoing disclosure relating to the invention disclosed in the present inventor's prior copending patent application, Ser. No. 149,283, filed June 2, 1971 now U.S. Pat. No. 3,752,556, the invention is arranged so that certain elements are positioned (and certain functions also take place) at focal points of two interrelated ellipses arranged with their long axes normal to each other and with $f_2$, the second focal point of each ellipse, coinciding. In the present invention, the inventor has made a further improvement by the addition of a third ellipse, whose long axis is perpendicular to the long axes of both the other two ellipses. The focal point $f_2$ of the third ellipse is common with both the other ellipses. The advantage of this improved arrangement is that is permits the moving scene to be holographed clearly, even through the scene is moving in a random direction with velocity vectors of random value along three (X, Y, Z) axes.

FIG. 5 has been modified slightly in this application to show how the two-ellipse system can be improved to add a third ellipse. To do so, an additional beam splitter 99 is added in the path of signal beam 70, between beam splitter 92 and mirror 94. This beam splitter serves to provide illumination for the said third ellipse. This illumination from beam splitter 99 is a third direct signal beam 101 which is incident upon mirror m at the second foci $f_1''$ of the third ellipse. The third direct signal beam 101 is reflected by mirror m to be incident upon the scene 88 where it is subsequently reflected to be incident upon the film located at back 78 positioned at focal point $f_2$, which is common to all three ellipses.

It should be understood that FIG. 5 is a schematic placement of components. In the present invention as well as in any other holographic device, the requirement for the matching of all path lengths for both reference and signal (object) beams must be satisfied. Consequently, when the arrangement of FIG. 5 is set up in the laboratory, the precise position of the beam splitters must be determined by the specific geometry employed in the apparatus at the time. Since the path length for the direct signal beam for each of the ellipses must be equal to the path length for each of the other ellipses, any mismatch in these path lengths will be at the expense of the coherence length of the radiation source employed.

Figures 6A, 6B:
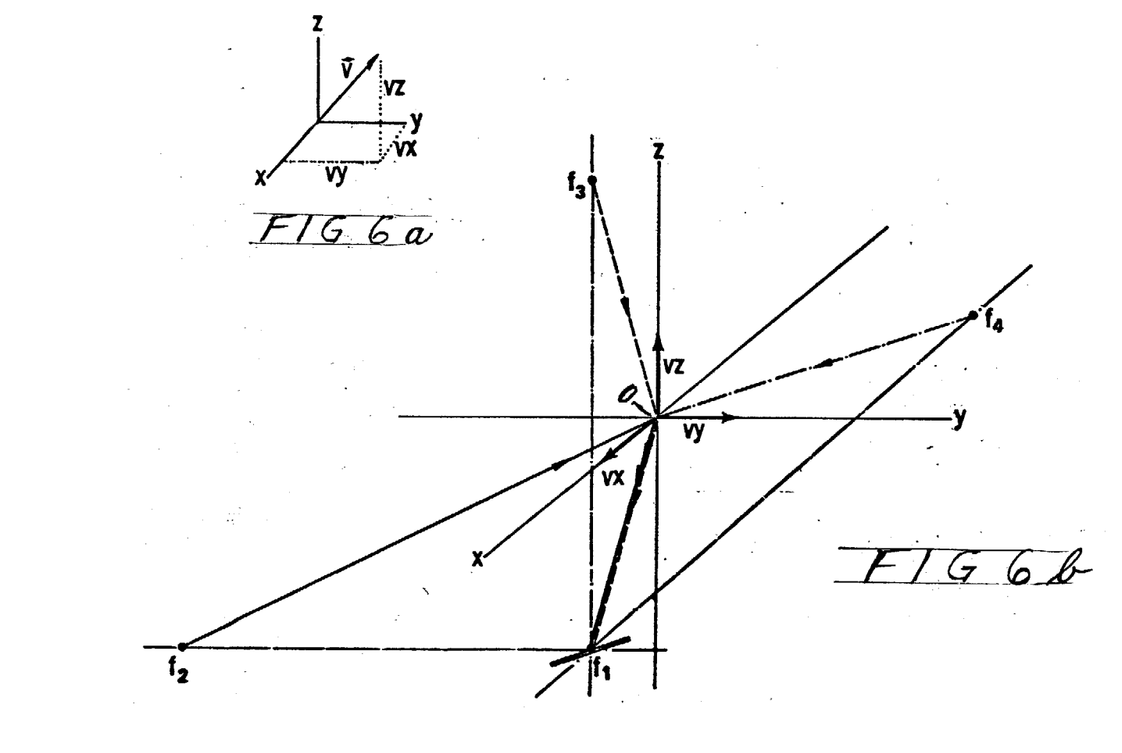
FIG. 6a is a vector diagram relating to FIG. 6b below.
FIG. 6b shows a three ellipse arrangement of the invention shown in FIG. 5 for a point having a velocity vector V.

Attention is now directed to FIG. 6. Here we have employed three separate systems like that one described by FIG. 4. The object of interest now is just a point, having a random velocity vector whose components are $vx$, $vy$ and $vz$. The total velocity vector then for this point is $$\vec{V} = \hat{i}Vx + \hat{j}Vy + \hat{k}Vz$$

where we have used the notation of a rectangular cartesian coordinate system. The magnitude of such a vector, i.e., the speed is given by $$V = \sqrt{Vx^2 + Vy^2 + Vz^2}$$

The three separate systems employed are used in the following fashion. One for the $Vx$ component of velocity, which will be a velocity in one line or axis. One for $Vy$ and one for $Vz$. These three systems are oriented in a unique way such that the three separate velocity components are measured in mutually perpendicular planes; (See insert FIG. 6). These three separate systems so combined may be identified as described below. Observe FIG. 6 from the left.

The solid line from $f_2$ to 0 to $f_1$ represents the path of the object beam for the elliptical system necessary to record the velocity component $Vy$. The film recorder is placed at foci $f_1$. Foci $f_1$ is common to all three elliptical systems. Proceeding this time in the same plane, we note the dash dot line from $f_4$ to 0 to $f_1$. This sytem records the velocity component $Vx$. The third and final system is perpendicular to this plane and its object beam path length is traced by the dashed line, which goes from $f_3$ to 0 to $f_1$. It may be above or below the plane depending upon the motion involved. The reference beam has not been shown but it must be so placed as to satisfy the requirements of holographic theory.

Figures 7A, 7B:
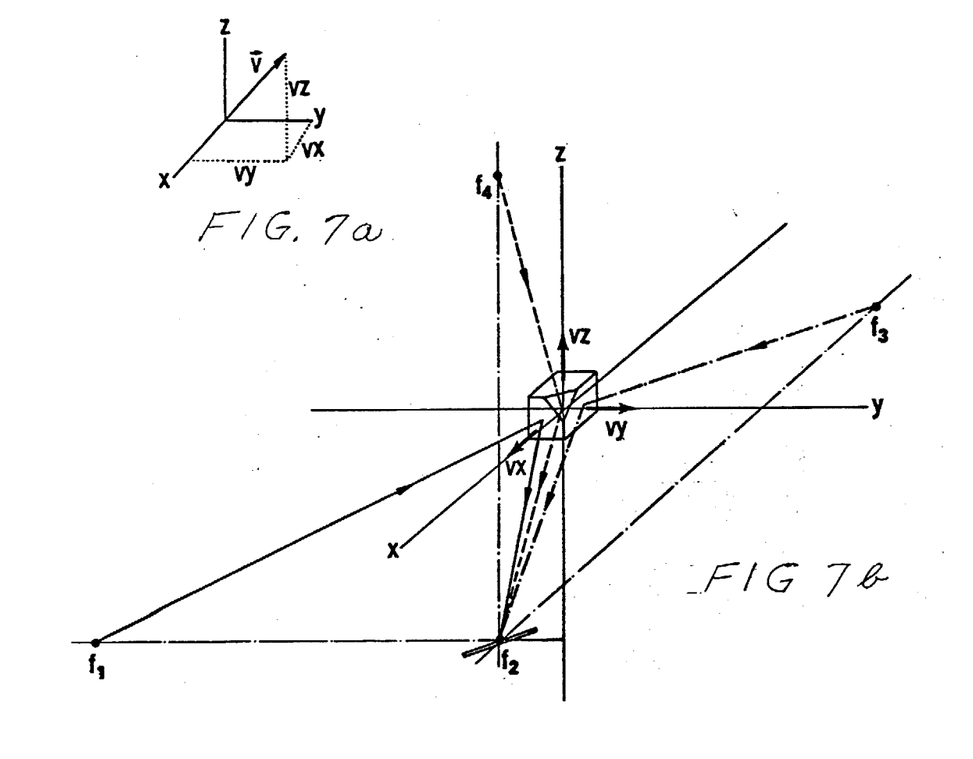
FIG. 7a is a vector diagram relating to FIG. 7b below.
FIG. 7b is a three ellipse arrangement of the invention shown in FIG. 5 for a finite object having a velocity vector V.

FIG. 7 is similar to FIG. 6 and simply shows the same three separate systems oriented in the same unique fashion. However, the object here is of finite size and not a point. This depicts the more practical situation and shows that the size of the three ellipses used are a function of the expected magnitude of the velocity component to be recorded as well as the actual size of the object of interest. Since this technique records three mutually perpendicular velocity components simultaneously and on the same hologram then the technique will allow front surface detail to be holographically recorded from an object having a randomly oriented velocity vector moving within some predetermined volume. The object to be holographed could be, for example, a person on a stage or a particle confined to a chamber.

The laser source for this invention is preferably a high intensity argon type having 2–8 watts of continuous power. An even higher intensity shorter pulse length source would be better, if it were available. If the laser source used in a particular application is not of high enough intensity to properly practice this invention, one may use the concept of pre-biasing the film. Then the intensity available in the argon lines will be sufficient for multiple type exposures commensurate with moving scenes.

Using the technique disclosed herein and a pulse length of 35 nanoseconds, a projectile velocity of $9 \times 10^5$ cm/sec would not cause an optical path difference of more than $\lambda/8$. This is well within the tolerance necessary for producing good holograms. It should be noted, however, that the resolution of front surface detail obtained by this invention is not due solely to the "stop action" of the pulse length of the laser pulse. This is obvious from the fact that for a pulse length of 50 nanoseconds, a velocity as low as 694.4 cm/sec would cause a phase shift of $\lambda/2$ which borders on prohibiting the recording of a hologram.

It is necessary in practicing this invention to use a specific orientation of the holographic system, as described in detail above. With this specific orientation, the path of the reflection arm is constrained to change by an amount equal to $\lambda/8$, an arbitrary figure well within the $\lambda/2$ limitation. Thus resolution of front surface detail can be obtained, although this was heretofore unobtainable for moving targets, by previously known methods.

From the foregoing, it may be seen that the applicants has invented a holographic motion picture camera which can produce three dimensional motion pictures having resolution of front surface detail of moving scenes. The invention has the capability of handling moving scenes traveling at up to 9×10⁵ cm/sec (21,450 MPH) and having X, Y and Z axis vectors of random value. Moreover, the technique is capable of recording resolution of front surface detail from a projectile moving at very high velocities, depending upon the pulse duration of the laser source, its power output and the tolerance of the optical path difference. This invention allows three dimensional images of any scene where one would normally use a conventional two dimensional motion picture camera. The invention may incorporate folded optics to make the system package smaller.

What is claimed is:

1. An apparatus for producing holographic motion pictures of a scene, moving in a random direction within a volume, said moving scene having a velocity of motion represented by X, Y and Z velocity components, comprising:

a light source for producing a coherent beam of radiation;

first beam splitter means positioned to receive said coherent beam and to split said coherent beam into two beams, a first signal beam which passes straight through said first beam splitter means and becomes incident upon said moving scene and a reference beam which is reflected;

second beam splitter means positioned to receive said reflected reference beam and to split a second signal beam from said reference beam, whereby said reference beam passes straight through said second beam splitter means and said second signal beam is reflected;

third beam splitter means positioned to receive said second signal beam and to split a third signal beam from said second signal beam, whereby said second signal beam passes straight through said third beam splitter means and said third signal beam is reflected;

a first light reflector means positioned to reflect said reference beam, after said reference beam passes through said second beam splitter means;

a second light reflector means positioned to reflect said second signal beam so that it becomes incident upon said moving scene, after said second signal beam is split from said reference beam by said second beam splitter means;

a third light reflector means positioned to reflect said third signal beam so that it becomes incident upon said moving scene, after said third signal beam is split from said second signal beam by said third beam splitter means;

a motion picture camera back, said camera back having a film mounted on it, said film being positioned to receive said reference beam after reflection from said first light reflector means and said first, second and third signal beams after they are reflected from said moving scene, whereby said reference beam and said first, second and third signal beams all interfere with one another in the plane of said film;

said first beam splitter means being positioned at the first focus of a first ellipse, said second light reflector means being positioned at the first focus of a second ellipse, and said third light reflector means being positioned at the first focus of a third ellipse, the said three ellipses being interrelated by having their long axes perpendicular to each other and their second foci coinciding, said three ellipses being oriented so that said X velocity component of said moving scene is tangent to said first ellipse, said Y velocity component of said moving scene is tangent to said second ellipse, said Z velocity component of said moving scene is tangent to said third ellipse, and said long axes of said three ellipses are respectively parallel to said X, Y and Z velocity components, the plane of said film being positioned so as to pass through the said coinciding second foci of the said three ellipses, said moving scene being positioned on the mathematical circumference of each of said ellipses in the vicinity of the intersection of the circumference of each said ellipse with its own semi-minor axis, the size and shape of each of said three ellipses and the location of their said foci being determined by the formula $Vt = (\Delta L/2)^{1/2} a^{3/2}/b \Rightarrow \Delta x$ (or $\Delta Y$ or $\Delta Z$), where V is the velocity component; $t$ is the time of exposure; L is the optical path length of said first signal beam and is equal to the ellipse constant, $2a$; $\Delta L$ is the maximum change in length L caused by the component of scene travel which is tolerable without causing blurring; $a$ is the semi-major axis; $b$ is the semi-minor axis; $d$ is the distance of separation between a focus and the origin of the ellipse; and $a$ and $b$ are related to the third ellipse parameter $d$ by the formula $a^2 = b^2 + d^2$.

2. The apparatus for producing holographic motion pictures of a moving scene as recited in claim 1 including a first diffuser in the path of said first signal beam between said first beam splitter means and said moving scene.

3. The apparatus for producing holographic motion pictures of a moving scene as recited in claim 2 including a second diffuser in the path of said second signal beam between said second signal beam between said second light reflector means and said moving scene.

4. The apparatus for producing holographic motion pictures of a moving scene as recited in claim 3 including a third diffuser in the path of said third signal beam between said third light reflector means and said moving scene.

* * * * *